United States Patent [19]

Turley

[11] 4,007,160
[45] Feb. 8, 1977

[54] CHLORINE-CONTAINING EPOXY COMPOSITION

[75] Inventor: Richard J. Turley, Orange, Conn.

[73] Assignee: Olin Corporation, New Haven, Conn.

[22] Filed: Oct. 28, 1975

[21] Appl. No.: 625,906

[52] U.S. Cl. .......................... 260/47 EC; 260/2 EP; 260/2 EC; 260/2 N; 260/18 EP; 260/47 EN; 260/47 EP; 260/59 EP; 260/45.8 A; 260/78.41

[51] Int. Cl.² ....................................... C08G 59/18

[58] Field of Search ......... 260/47 EP, 47 EC, 2 EP, 260/2 EC, 18 EP, 45.8 A, 78.41, 59 EP, 47 EN, 2 N

[56] References Cited

UNITED STATES PATENTS 3,102,874  9/1963  Bremmer ..................... 260/47
3,914,202  10/1975  Shelley .................... 260/47 EP Primary Examiner—Harold D. Anderson
Assistant Examiner—E. A. Nielsen
Attorney, Agent, or Firm—F. A. Iskander; Thomas P. O'Day

[57] ABSTRACT

An improved epoxy resin composition is disclosed which incorporates 4,4,4-trichloro-1,2-epoxybutane. The improved composition is used in various coating and molding applications.

7 Claims, No Drawings

CHLORINE-CONTAINING EPOXY COMPOSITION

This invention relates to an improved, chlorine-containing epoxy resin composition.

Various epoxy resins have been known in the prior art. Widely used such resins include the glycidyl ethers which are prepared, for example, by reacting an epihalohydrin with hydroxylated compounds. In the presence of a catalyst, these resins cure into solid materials that are commonly used in the manufacture of coatings, molding compositions and adhesives.

In general, it is also known that the burning properties of epoxy resins can be modified or reduced by the incorporation of chlorine therein. According to the prior art, this may be achieved by the addition of a non-reactive chlorine-containing material, e.g., chlorinated phenol and dichlorohydrin, such a material being usually combined with antimony oxide to enhance the effect of the chlorine in reducing the combustibility of the resin. See also Russian Patent 191,021 which discloses the incorporation of chlorinated polyethylene in epoxy adhesives. Alternatively, the chlorine may be chemically bound to the resin as taught in U.S. Pat. Nos. 2,839,496 and 3,496,120. The former patent teaches the use of 1,4,5,6,7,7-hexachloro-2-(2,3-epoxypropoxymethyl)-bicyclo(2.2.1)hept-5-ene as a reactive diluent with epoxide condensation products. And U.S. Pat. No. 3,496,120 discloses the preparation of polyether epoxide compositions by reacting together an epihalohydrin, a polyol, and a chlorinated alkylene oxide such as 4,4,4-trichloro-1,2-epoxybutane. The polyepoxide products of such a reaction are then dehydrohalogenated to yield resinous materials which can be cross-linked into hard plastics that are said to be non-burning.

It is a primary object of this invention to provide an improvement in the art of reducing the combustibility of epoxy resins. A more specific object is to provide a simple-to-prepare and economically attractive chlorine-containing epoxy composition which exhibits a markedly reduced level of combustibility.

These and other objects can be achieved by incorporating 4,4,4-trichloro-1,2-epoxybutane into curable epoxy compositions. Thus according to the invention, an improved, liquid, curable epoxy composition is provided which is comprised of (a) an epoxy resin having more than one α-epoxy group per molecule, (b) a curing agent for the resin, and (c) 4,4,4-trichloro-epoxybutane.

Any of the variety of prior art liquid, curable epoxy resins having more than one α-epoxy group in the molecule may be used in the composition of the invention. However, it is generally preferred to employ the glycidyl ether type epoxy resins. These are generally prepared by reacting an epihalohydrin with a polyhydroxy compound in a liquid caustic medium. Such and other epoxy resins and their preparation are described in detail in H. Lee and K. Neville, *Handbook of Epoxy Resins*, McGraw-Hill, Inc., New York (1967). The entire diclosure of this book is incorporated herein by reference.

Illustrative glycidyl type epoxy resins include the glycidyl ethers of bisphenols such as bisphenol A, the glycidyl ethers of mononuclear di- and trihydric phenols, the glycidyl ethers of aliphatic polyols, the glycidyl ethers of novolac resins, and the glycidyl ethers of polynuclear phenols. Because of their ready commercial availability, the glycidyl ethers of bisphenol-A are especially preferred such as may be represented by the structural formula

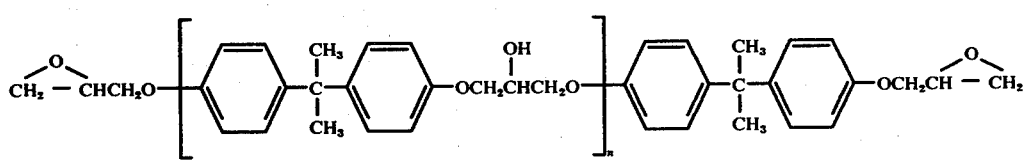

wherein n represents a number of 1 or less.

The epoxy resin composition of the invention includes a curing agent or catalyst. Here again any such material known in the prior art to be an effective curing agent for a particular epoxy resin as defined herein or for any generic group of epoxy resins may be employed where feasible or desirable. This may include two or more ingredients which act together as a curing system for the epoxy resin. The curing agent or system, when mixed with the epoxy resin, serves to transform it from the liquid or thermoplastic state to a hard thermoset solid; and, depending on the nature of the particular curing agent, this transformation occurs by the curing agent acting as a catalyst to promote the curing process, or the curing agent may participate in a reaction with the epoxy resin thereby becoming chemically bound into the resin chain.

Illustrative epoxy resin curing agents include basic materials, such as the Lewis bases, the inorganic bases, the primary and secondary amines, and the amides; and acidic materials such as the Lewis acids, the carboxylic acid anhydrides, and the dibasic organic acids. These and other curing agents are described in detail in the above-cited Handbook of Epoxy Resins.

The curing agent is employed in any suitable proportion which is effective in curing the epoxy resin. As is well known in the art, such proportion depends in large part on the chemical nature of the curing agent and on the rate of curing which is desired. Therefore, a specific proportion which is applicable in the case of one curing agent may represent an insufficient or excessive level, as the case may be, when a different curing agent is used. Thus the term "effective amount", as used in the specification and claims herein with reference to the curing agent, is intended to encompass any such proportion of a particular curing agent or group of curing agents which may suitably be used to bring about curing of the epoxy resin. For general illustration, depending on the particular material used, the curing agent may be employed in a proportion of about 4-100 parts per every 100 parts by weight of the epoxy resin.

In addition to the curing agent, if desired other ingredients may be added to the epoxy resin, such as taught in the prior art, in order to modify the properties of the resin or to achieve certain objectives in connection with its processing and commercial utilization. This includes, for example, fillers, solvents or diluents, resin modifiers, and plasticizers.

Pursuant to the invention, reduced combustibility is imparted to the epoxy resin by incorporating or mixing therewith 4,4,4-trichloro-1,2-epoxybutane (hereinafter referred to as "TCBO"). This material may be used in purified form or as a crude product of the dehydrohalogenation of 4,4,4-trichloro-2-halobutanol. Such crude product is described in U.S. Pat. No. 3,847,844, issued Nov. 12, 1974 to Fuzesi et al, the entire disclosure of which is incorporated herein by reference.

The TCBO may be used in any proportion which is effective in reducing the combustibility of the epoxy resin. For example, such a proportion may range from about 5 to about 300, and preferably about 15–250 parts per every 100 parts of the epoxy resin; and pursuant to the most preferred embodiments of the invention, the TCBO is employed in a proportion which ranges from about 25 to about 220 parts per every 100 parts by weight of the epoxy resin.

In preparing the epoxy composition of the invention, the TCBO and the curing agent are simply added to, and mixed with, the epoxy resin along with any other additives or diluents that may desirably be used. Thereafter the mixture is allowed to cure into a hard substance. Ordinarily such curing will take place at room temperature, so that elevated temperatures are not necessary. However, in practice it is preferred to employ moderately elevated temperatures, such as about 30°–100° C, and more preferably about 40°–80° C, in order to speed up the curing process.

Upon curing, the epoxy composition of the invention exhibits marked reduction in combustibility. As such it can be used to advantage in various coating, potting, casting and molding applications in which varying degrees of resistance to burning are required.

The following examples are provided to illustrate the invention. All parts and percentages given are by weight unless otherwise specified. In all of these examples, the epoxy resin used was diglycidyl ether of bisphenol-A (DGEBA), a commercial product of Shell Chemical Company purchased under the trademark EPON 828.

EXAMPLE 1

The amount of 2.5 grams of TCBO was blended with 10 grams of DGEBA. Then one gram of curing agent, namely, 85% phosphoric acid, was blended in, and the mixture was poured into an aluminum cup. A very large exotherm was observed, a maximum temperature being reached in about 5 minutes. After the resin had cooled to room temperature, the product was hard and glossy. No discoloration of the resin was noted, and no further curing occurred after additional time had passed, nor after heating for several hours at 60° C.

The flammability of the cured product was tested by applying a flame thereto. It was very difficult to ignite and did not sustain a flame when the ignition source was removed.

Control Test

The identical procedure of Example 1 was followed except that no TCBO was used. When a flame was applied to the cured resin, it quickly ignited and was completely consumed by the fire.

EXAMPLES 2–8

In these examples, the identical procedure of Example 1 was followed except for variations in the amounts of curing agent and TCBO used. The products of these examples varied from soft or flexible to hard, glossy resin. Otherwise, the same results were noted, with respect to large exotherms, non-discoloration and resistance to burning. Details of these examples are provided in Table I below.

TABLE I

| Example No. | 85% $H_3PO_4$ (gms.)* | TCBO (gms.)* | Cured Product Description |
|---|---|---|---|
| 1 | 1.0 | 2.5 | hard, glassy |
| 2 | 0.75 | 2.5 | hard, glassy |
| 3 | 0.50 | 2.5 | soft, slightly pliable |
| 4 | 1.25 | 5.0 | hard, glassy |
| 5 | 1.0 | 5.0 | slightly pliable |
| 6 | 0.75 | 5.0 | flexible |
| 7 | 2.0 | 10.0 | soft (hot mixture) |
| 8 | 1.5 | 10.0 | soft (hot mixture) |

*per 10 grams of DGEBA

EXAMPLES 9–14

In these examples, the procedure of the preceding examples was repeated. Here, however, instead of the phosphoric acid, triethylene tetramine (TETA) was employed as the curing agent. In the case of each of Examples 9–14 curing of the product required several days at room temperature or about 12 hours at 60° C. However, as with the preceding examples, no discoloration of the resin was noted, and the cured products were equally resistant to ignition. The various proportions of TETA and TCBO used in each example are indicated in Table II below along with a general description of the cured product.

TABLE II

| Example No. | TETA(gms.)* | TCBO(gms.)* | Cured Product Description |
|---|---|---|---|
| 9 | 1.0 | 5.0 | hard, glassy |
| 10 | 0.5 | 5.0 | soft gel |
| 11 | 3.5 | 20.0 | semi-rigid |
| 12 | 3.0 | 20.0 | semi-rigid |
| 13 | 4.5 | 20.0 | semi-rigid |
| 14 | 2.7 | 10.0 | rigid |

*per 10 grams of DGEBA

What is claimed is:
1. A liquid, curable epoxy composition comprised of
   a. an epoxy resin having more than one $\alpha$-epoxy group in the molecule,
   b. a curing agent for said resin, and
   c. 4,4,4-trichloro-1,2-epoxybutane in a proportion which is sufficient to reduce the combustibility of said resin.
2. The composition of claim 1 wherein said epoxy resin is a glycidyl ether.
3. The composition of claim 2 wherein said proportion ranges from about 15 to about 250 parts per every 100 parts by weight of said resin.

4. The composition of claim 3 wherein resin is a glycidyl ether of a hydroxylated material selected from the group consisting of a bisphenol, a mononuclear dihydric phenol, a mononuclear trihydric phenol, a polynuclear phenol, an aliphatic polyol, and a novolac resin.

5. The composition of claim 4 wherein said resin is a glycidyl ether of bisphenol-A.

6. The composition of claim 5 wherein said proportion is about 25–220 parts per every 100 parts by weight of said resin.

7. The composition of claim 6 wherein said curing agent is phosphoric acid or triethylene tetramine.

* * * * *